United States Patent
Zhu

(10) Patent No.: US 10,939,276 B2
(45) Date of Patent: Mar. 2, 2021

(54) METHOD AND APPARATUS FOR SESSION MANAGEMENT FUNCTION SELECTION

(71) Applicant: ZTE CORPORATION, Guangdong (CN)

(72) Inventor: Jinguo Zhu, Guangdong (CN)

(73) Assignee: ZTE CORPORATION, Guangdong (CN)

(*) Notice: Subject to any disclaimer, the term of this patent is extended or adjusted under 35 U.S.C. 154(b) by 0 days.

(21) Appl. No.: 16/574,990

(22) Filed: Sep. 18, 2019

(65) Prior Publication Data

US 2020/0015066 A1 Jan. 9, 2020

Related U.S. Application Data

(63) Continuation of application No. PCT/CN2017/079006, filed on Mar. 31, 2017.

(51) Int. Cl.
*H04W 8/06* (2009.01)
*H04W 60/00* (2009.01)
*H04W 8/10* (2009.01)

(52) U.S. Cl.
CPC ............. *H04W 8/06* (2013.01); *H04W 60/00* (2013.01); *H04W 8/10* (2013.01)

(58) Field of Classification Search
CPC ..... H04W 36/12; H04W 48/18; H04W 60/00; H04W 8/06; H04W 8/10; H04W 8/18; H04W 72/048; H04W 28/16
See application file for complete search history.

(56) References Cited

U.S. PATENT DOCUMENTS

| 2017/0339609 A1* | 11/2017 | Youn ..................... H04W 76/11 |
| 2017/0367036 A1* | 12/2017 | Chen ...................... H04L 43/08 |
| 2018/0176858 A1* | 6/2018 | Wang .................... H04W 48/10 |

FOREIGN PATENT DOCUMENTS

WO 2018175498 A1 9/2018

OTHER PUBLICATIONS

ZTE, Oracle,ETRI, Telecom Italia, KDDI, "Proposed architecture alignments of Network Slicing Conclusion with 5G Core Overall Architecture in TS 23.501", SA WG2 Meeting #119, S2-171027, Feb. 13-17, 2017,Dubrovnik, Croatia, 2 pages.
ZTE, Oracle,ETRI, Telecom Italia, KDDI, "Network Slicing Architecture Alignment for the Support of Standalone Network Slice Selection Function (NSSF)", SA WG2 Meeting #119, S2-171027, Feb. 13-17, 2017,Dubrovnik, Croatia, pp. 1-11.

* cited by examiner

*Primary Examiner* — Erica Navar
(74) *Attorney, Agent, or Firm* — Duane Morris LLP

(57) ABSTRACT

A method and apparatus for selecting session management functions are disclosed. In one embodiment, a method includes: receiving a registration request from a user equipment (UE) device; sending access location information and allowed slice information associated with the UE device to a logical network database; receiving accepted slice information and associated slice information of a home network from the logical network database; and sending a registration accepted message to the UE device, wherein the registration accepted message comprises the accepted slice information.

12 Claims, 4 Drawing Sheets

METHOD AND APPARATUS FOR SESSION MANAGEMENT FUNCTION SELECTION

CROSS-REFERENCE TO RELATED APPLICATION

The present application claims priority to PCT international application PCT/CN2017/079006, entitled "METHOD AND APPARATUS FOR SESSION MANAGEMENT FUNCTION SELECTION," filed on Mar. 31, 2017, which is expressly incorporated by reference herein in its entirety.

TECHNICAL FIELD

The disclosure relates generally to wireless communications and, more particularly, to systems and methods for selecting and allocating one or more network slice instances to a user equipment (UE) device.

BACKGROUND

As the number of applications and services for digital data continues to explode, the demands and challenges placed on network resources and operators will continue to increase. Being able to deliver a wide variety of network performance characteristics that future services will demand is one of the primary technical challenges faced by service providers today. The performance requirements placed on the network will demand connectivity in terms of data rate, latency, QOS, security, availability, and many other parameters, all of which will vary from one service to the next. Thus, enabling a network to allocate resources in a flexible manner to provide customized connectivity for each different type of service will greatly enhance the network's ability to meet future demands.

Network slicing is a technique that allows multiple logical networks to be created from a common shared physical infrastructure. The goal of network slicing is to enable the management of multiple logical networks as virtually independent business operations on the common physical infrastructure. Thus, a communication network, such as a public land mobile network (PLMN) operated by a network operation such as AT&T, for example, can be partitioned into different sets of virtual resources, each set called a "slice" that can be allocated for different purposes. For example, a slice can be allocated to a mobile virtual network operator (MVNO), an Enterprise customer, an Internet of Things (IoT) Domain, or any other predetermined set of services. Additionally, network slicing will allow different service providers to have distinct virtual networks that run on the same physical set of network and computing resources, each distinct virtual network dedicated to particular types of network traffic or services. A more detailed description of network slicing is provided by the Next Generation Mobile Networks (NGMN) Alliance and referenced in Annex B of the 3GPP TR 23.799 specification.

As used herein, the term "network" or "communication network" refers to infrastructure resources provided by network operator to provide data communication services, which may include both wired and wireless services, to customers of the network operation. Examples of such network operators include AT&T, Verizon, Sprint, Vodafone, etc. Such a network may include a core portion, a radio access network (RAN) portion and backhaul portion, for example. The network may further comprise various virtualized resources and functions as would be understood by persons of ordinary skill in the art. As these networks adopt the next generation network standards (i.e., 5G), referred to as "5G networks," they will become capable of network slicing and dynamic reconfiguration, as described in further detail below.

FIG. 1 illustrates an exemplary conventional architecture of a 5G communication system that spans two networks, i.e., a visited serving network 100 and a home network 120 of a user equipment (UE) device 104. Both the visited network 100 and the home network 120 may be public land mobile networks (PLMN's), for example. In this example scenario, the UE device 104 is roaming away from its home network 120 and is located in the visited, serving network 100. The visited network includes an Access and Mobility Management Function (AMF) 104 which performs various access management functions that allow the UE 102 to access the 5G Random Access Network (RAN) 106. The visited network 100 further includes a visited Session Management Function (vSMF) 108 and a visited User Plane Function (vUPF). The AMF 104 includes the following functionalities: registration management, connection management, reachability management and mobility management. This AMF 104 also performs access authentication and access authorization functions for the UE. The AMF 104 is also the non-access stratum (NAS) security termination and relays the session management (SM) NAS between the UE 102 and vSMF 108, etc. Persons of ordinary skill in the art are familiar with the conventional functions of the AMF 104.

The vSMF 108 performs the following functions: session management (e.g., session establishment, modification and release, UE IP address allocation & management (including optional authorization functions), selection and control of UP function, downlink data notification, etc. The vUPF 110 includes the following functionalities: serving as an anchor point for intra-/inter-radio access technology (RAT) mobility, packet routing & forwarding, traffic usage reporting, QoS handling for the user plane, downlink packet buffering and downlink data notification triggering, etc. Persons of ordinary skill in the art are familiar with the conventional functions of the vSMF 108 and vUPF 110.

The home network 120 includes a home SMF 122, which has the same or similar conventional functions for the home network 120 as those described above for the vSMF 108. The home network 120 further includes a home UPF 124, which as the same or similar conventional functionality as the vUPF 110 discussed above. At least one data network 126 also resides within the home network 120, which is a network providing service to the UE 102, such as the IMS network, Internet, etc. It is understood that FIG. 1 does not include all of the infrastructure, components, resources and functions of a 5G network but, rather, only a subset of the infrastructure, components, resources and functions that are pertinent to the present disclosure.

As used herein, the term "function" refers to one or more virtual functions performed by one or more physical resources of a network, which are configured to perform the corresponding function. Such physical resources can include one or more processors, computers, servers, memories, databases, communication interfaces, etc. that may be co-located in a single network communication node or distributed among multiple nodes. Persons of ordinary skill in the art would be familiar with how the "functions" discussed herein can be implemented via hardware, firmware, software or any combination of these techniques.

As discussed above, a network slice is a complete logical network that provides a set of network functions and allocates corresponding network resources necessary to provide certain network capabilities and network characteristics. As used herein, a network slice instance (NSI) is the instantiation of a network slice. Network slice selection assistance information (NSSAI) refers to information that can be used to identify one or more network slices that correspond to one or more service features and/or characteristics such as type of service (e.g., voice, data, etc.), QoS, etc. Typically, NSSAI is a collection of specific or single NSSAI's (S-NSSAI). A S-NSSAI identifies a specific network slice that can provide a specific requested service and, therefore, support a particular type of session (e.g., a voice call). An S-NSSAI can include: (1) a slice/service type (SST), which refers to the expected network slice behavior in terms of features and services; and (2) a slice differentiator (SD), which is optional information that complements the SST type(s) to allow further differentiation for selecting a network slice instance from the potentially multiple network slice instances that all comply with the indicated SST. NSSAI and S-NSSAI are both generally referred to herein as "slice information."

Typically, the UE 102 stores a configured NSSAI received from the home network 120, and if registered with the visited network 100, the UE also stores "accepted NSSAI" received from the visited network 100. The configured NSSAI is configured in a UE by the home network 120 to be used in a visited network (e.g., visited PLMN 100) when no network-specific accepted NSSAI is stored in the UE. The accepted NSSAI is the NSSAI provided by the visited network (e.g., visited PLMN 100) to the UE during a registration procedure and the UE thereafter uses the accepted NSSAI in the visited network until the next time a registration procedure with the visited network is performed. However, since the accepted NSSAI is specific to the visited network, in a UE roaming scenario as depicted in FIG. 1, it is unclear how to allocate the accepted NSSAI to one or more network slices of the home network 120 in order to provide end-to end services to the UE 102.

Further, after registration with the visited network 100 is complete, during a subsequent packet data unit (PDU) session establishment procedure, for example, the UE 102 will provide requested S-NSSAI to the AMF 104. The requested S-NSSAI is a subset of the accepted NSSAI previously stored in the UE 102 during registration, and corresponds to the specific type of session or service requested by the UE 102. For a non-roaming scenario, the AMF 104 selects a session management function (SMF) in a network slice instance (NSI) based on requested S-NSSAI, data network name (DNN) and other information. For a roaming scenario, it is unclear how to map the request S-NSSAI to both the visited network 100 and the home network 12, since the UE's requested S-NSSAI is specific to the visited network 100.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In one embodiment, a method includes: receiving a registration request from a user equipment (UE) device; sending access location information and allowed slice information associated with the UE device to a logical network database; receiving accepted slice information and associated slice information of a home network from the logical network database; and sending a registration accepted message to the UE device, wherein the registration accepted message comprises the accepted slice information.

In a further embodiment, a method includes: receiving a requested slice information from a wireless communication device; sending a network slice instance selection request message to a first database that maintains function information pertaining to at least one network slice instance, and wherein the network slice instance selection request message comprises the requested slice information, and an indication that a requested data session is home routed; receiving a network slice instance selection response message from the first database; selecting a first session management function associated with a serving network slice instance; and selecting a second session management function associated with a home network slice instance.

In another embodiment, an apparatus includes: at least one processor and a memory coupled to the processor, the at least one processor configured to: receive a registration request from a user equipment (UE) device; send access location information and allowed slice information associated with the UE device to a logical network database; receive accepted slice information and associated slice information of a home network from the logical network database; and send a registration accepted message to the UE device, wherein the registration accepted message comprises the accepted slice information.

In yet another embodiment, an apparatus includes: at least one processor and a memory coupled to the at least one processor, the at least one processor configured to: receive a requested slice information from a wireless communication device; send a network slice instance selection request message to a first database that maintains function information pertaining to at least one network slice instance, and wherein the network slice instance selection request message comprises the requested slice information, and an indication that a requested data session is home routed; receive a network slice instance selection response message from the first database; select a first session management function associated with a serving network slice instance; and select a second session management function associated with a home network slice instance.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention to facilitate the reader's understanding of the invention. Therefore, the drawings presented herein should not be considered limiting of the breadth, scope, or applicability of the invention. It is also noted that for clarity and ease of illustration, the drawings are not necessarily drawn to scale.

DETAILED DESCRIPTION OF EXEMPLARY EMBODIMENTS

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

As described below, the operations illustrated in FIGS. 2-5 may refer to functional entities, such as UE, AMF, UPF, etc. (either in physical or virtual form), which are similar to those mentioned above with respect to conventional 5G communication systems. As would be understood by persons of ordinary skill in the art, however, such conventional functional entities do not perform the functions described below, and therefore, would need to be modified or specifically configured to perform one or more of the operations described below. Additionally, persons of skill in the art would be enabled to configure functional entities to perform the operations described herein after reading the present disclosure. The term "configured" as used herein with respect to a specified operation or function refers to a system, device, component, circuit, structure, machine, etc. that is physically or virtually constructed, programmed and/or arranged to perform the specified operation or function.

Figure 1:
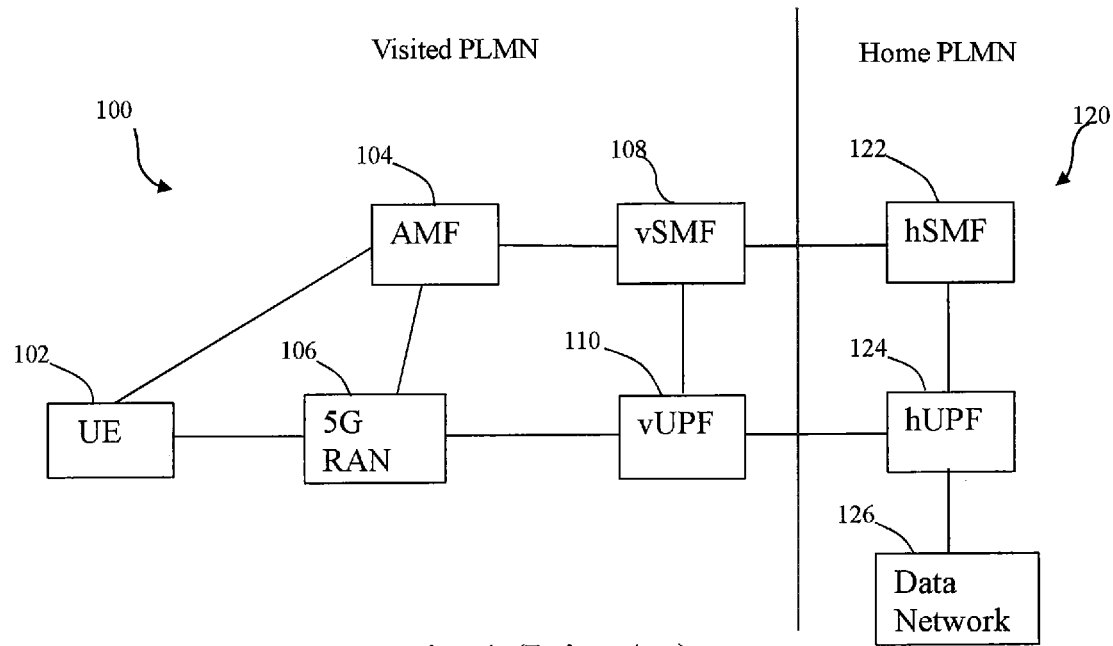
FIG. 1 illustrates a conventional 5G communication system comprising two networks.
Figure 2:
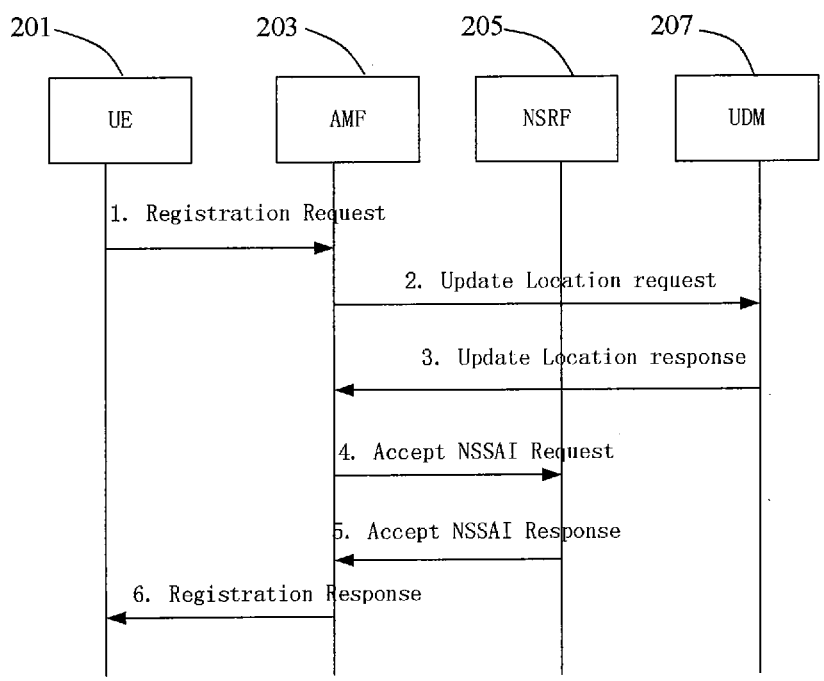
FIG. 2 illustrates a method of performing UE registration in a visited, serving network, in accordance with one embodiment of the invention.

FIG. 2 illustrates a method of UE registration in a visited network, in accordance with one embodiment. At operation 1, a UE 201 sends a registration request to an AMF 203 located in a visited network (e.g., PLMN 100). In some embodiments, this registration request can include a subscriber permanent identifier (SUPI) or a temporary User ID, configured NSSAI and other information. Upon detecting the registration request from the UE 201, the 5G RAN 106 sends access location information together with the registration request to the AMF 203. In some embodiments, if the temporary User ID is used, the AMF 203 obtains the UE context, which includes at least the UE security context, registration context, etc., based on the temporary User ID.

Next, at operation 2, the AMF 203 may perform an authentication procedure. If the authentication procedure succeeds, the AMF 203 sends a Location Update Request (LUR) to a user data management (UDM) database 207 associated with the home network 120. In one embodiment the UDM database 207 may be a subscriber database that is maintained by the home network 120, and which defines all the services, features and parameters associated with a user's account established with an operator of the home network. At operation 3, the UDM 207 sends a LUR response message that includes subscription data associated with UE 201 to the AMF 203. In some embodiments, the subscription data includes allowed NSSAI which is specific to the home network 120. In accordance with some embodiments, the allowed NSSAI is the most up-to-date version of NSSAI associated with the home network 120 and may contain additional, different or revised service parameters and characteristics when compared to the configured NSSAI that was previously stored in the UE 102.

Next at operation 4, the AMF 203 allocates a temporary user identity and a tracking area identifier (TAI) list based on a current location of the UE 201. At operation 4, the AMF 203 sends an accepted NSSAI request to a network slice repository function (NSRF) 205. The NSRF is a database and function that maintains a network slice instance (NSI) topology associated with one network (e.g., PLMN) and provides a NSI selection service to requesting network functions. In some embodiments, the accepted NSSAI request sent to the NSRF 205 includes the tracking area identifier (TAI) list, configured NSSAI received from UE and allowed NSSAI received from the UDM. Next, at operation 5, the NSRF 205 generates an accepted NSSAI response message and sends the response message back to the AMF 203.

In some embodiments, the NSRF 205 generates the accepted NSSAI as follows: (1) maps the configured NSSAI and allowed NSSAI to corresponding NSSAI of the serving network; (2) finds the common NSSAI from the mapped configured NSSAI and the mapped allowed NSSAI; and (3) generates the accepted NSSAI within the common NSSAI which is supported in the area indicated by TAI list. The NSRF 205 then sends the accepted NSSAI response to the AMF 203. In some embodiments, the accepted NSSAI response includes the generated accepted NSSAI and associated NSSAI of the home network 120. In some embodiments, the associated NSSAI of the home network 120 may be determined in advance by mutual agreement between respective operators of the visited network 100 and the home network 120, in an effort to provide seamless end-to-end connectivity for certain services when users roam between the two networks.

In some embodiments, the accepted NSSAI response message may further include information identifying or pointing to NSIs associated with the accepted NSSAI, such as the network function repository function (NFRF) address(es) of the NSIs. Generally, a NFRF is a database and function that maintains the network function topology within an NSI and provides network function discovery services to other network functions. For example, during a PDU session establishment, the AMF 203 can consult with the NFRF and the NFRF will reply with the SMF address of the NSI. If an NSI is a complete logical network which includes both a subset of the visited network 100 (e.g., vPLMN subset) and a subset of the home network 120 (e.g., hPLMN subset), the NSRF 205 may respond with both a vNFRF address associated with the visited network 100 and a hNFRF address associated with the home network 120. Next, at operation 6, the AMF stores the accepted NSSAI and the associated NSSAI of the home network 120. If an NFRF address of a NSI is also received, the AMF 203 also stores it. Thereafter, the AMF 203 sends a registration accept response message to the UE 201 via the 5G RAN 106. In some embodiments, this message includes the temporary user identity, TAI list and the accepted NSSAI. The UE 201 stores the accepted NSSAI for future use to establish a data session such as a PDU session, for example.

Figure 3:
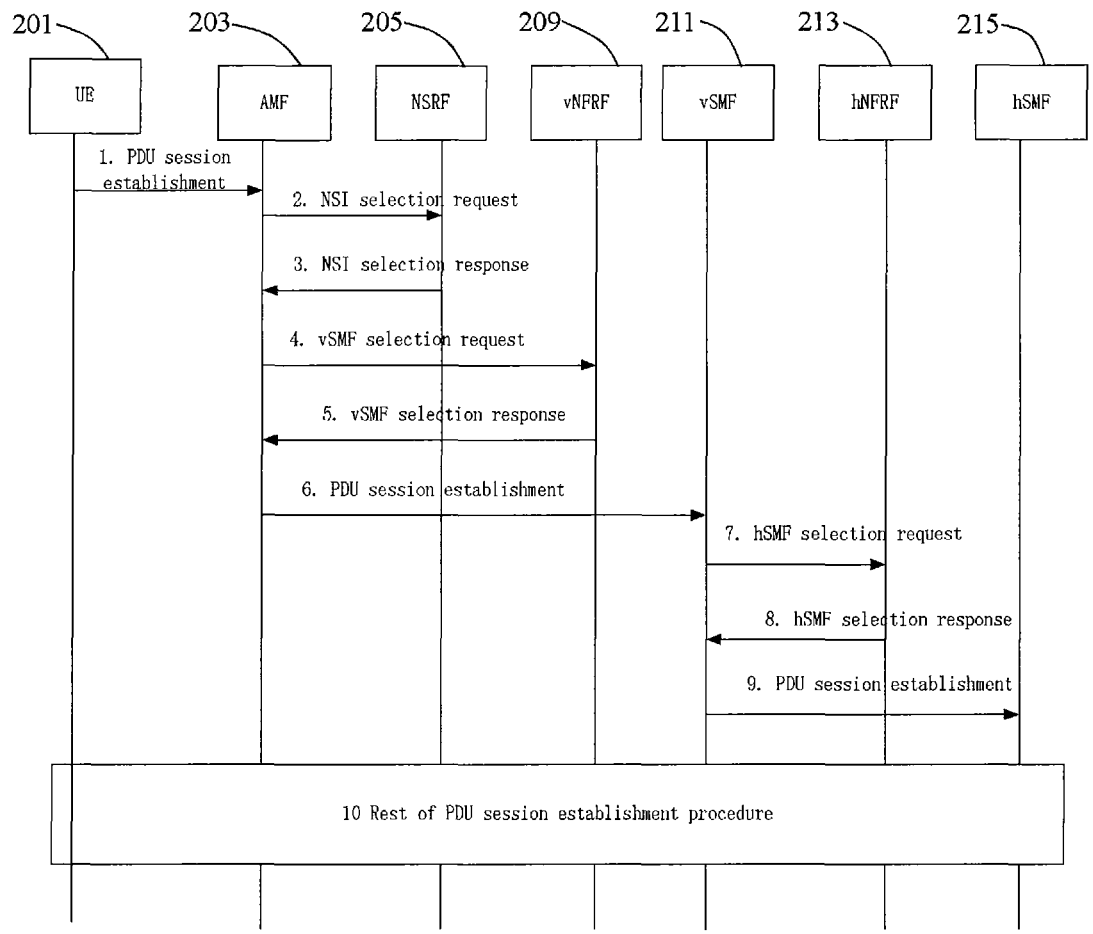
FIG. 3 illustrates a method of establishing a packet data unit (PDU) session across a visited network and a home network, in accordance with one embodiment of the invention.

FIG. 3 illustrates a method of establishing a PDU session across both a visited network 100 and a home network 120, in accordance with one embodiment of the invention. At a first operation, the UE 201 sends a SM NAS PDU session establishment message to the AMF 203. In some embodiments, this message includes the requested S-NSSAI, a Data Network Name (DNN) and other session related information. In one embodiment, if the AMF 203 already has the NSI information corresponding to the requested S-NSSAI, the AMF 203 selects a corresponding NSI and then proceeds to operation 4, as described below. If the AMF does not have the NSI information corresponding to the requested S-NSSAI, at operation 2, the AMF 203 sends a NSI selection request message to NSRF 205. In some embodiments, this request message includes the requested S-NSSAI and an indication of whether the requested PDU session is home routed or not. As used herein, "home routed" means user traffic is routed from the visited serving network 100 through the UE's home network 120 before arriving at its final destination. Likewise, any incoming traffic to the UE attaching to the visited serving network 100 will come from the UE's home network 120. Such "home routed" sessions enable a home network to track and manage subscriber parameters such as types of services utilized, data usage, session length, QoS, etc., for purposes of ensuring quality of service and accurate billing, for example.

Next at operation 3, the NSRF 205 selects one NSI and responds to the AMF 203 with a NSI selection response message. This message includes the selected NSI information such as a vNFRF address in the visited serving network. If the PDU session is home routed, this message also includes the hNFRF address in home network. At operation 4, the AMF 203 sends a SMF selection request to the vNFRF 209 of the selected NSI. In some embodiments, this message includes the network function type set as "SMF," the current UE location and may also include the requested S-NSSAI. Next, at operation 5, the vNFRF 209 selects one vSMF 211 and responds to the AMF with a vSMF selection response. This message includes the address of the selected vSMF 211. At operation 6, the AMF 203 forwards the SM NAS PDU session establishment message received from UE to the selected vSMF 211. If the PDU session is home routed, the AMF 203 maps the requested S-NSSAI to the associated S-NSSAI of home network, and the message includes the mapped S-NSSAI of the home network and the hNFRF address of the selected NSI.

Next at operation 7, if the PDU session is home routed, the vSMF 211 further sends a SMF selection request to hNFRF 213. This request message includes the network function type set as "SMF" and the associated S-NSSAI of the home network. At operation 8, the hNFRF 213 selects one hSMF 215 in the home network and responds to the vSMF 211 with a SMF selection response, which includes the address of the selected SMF. At operation 9, the vSMF 211 forwards the SM NAS PDU session establishment message received from AMF 203 to the hSMF 215, which includes the associated S-NSSAI of the home network mapped from the requested S-NSSAI, in accordance with various embodiments of the invention. At operation 10, the remaining steps for PDU session establishment are performed in accordance with conventional techniques.

Figure 4:
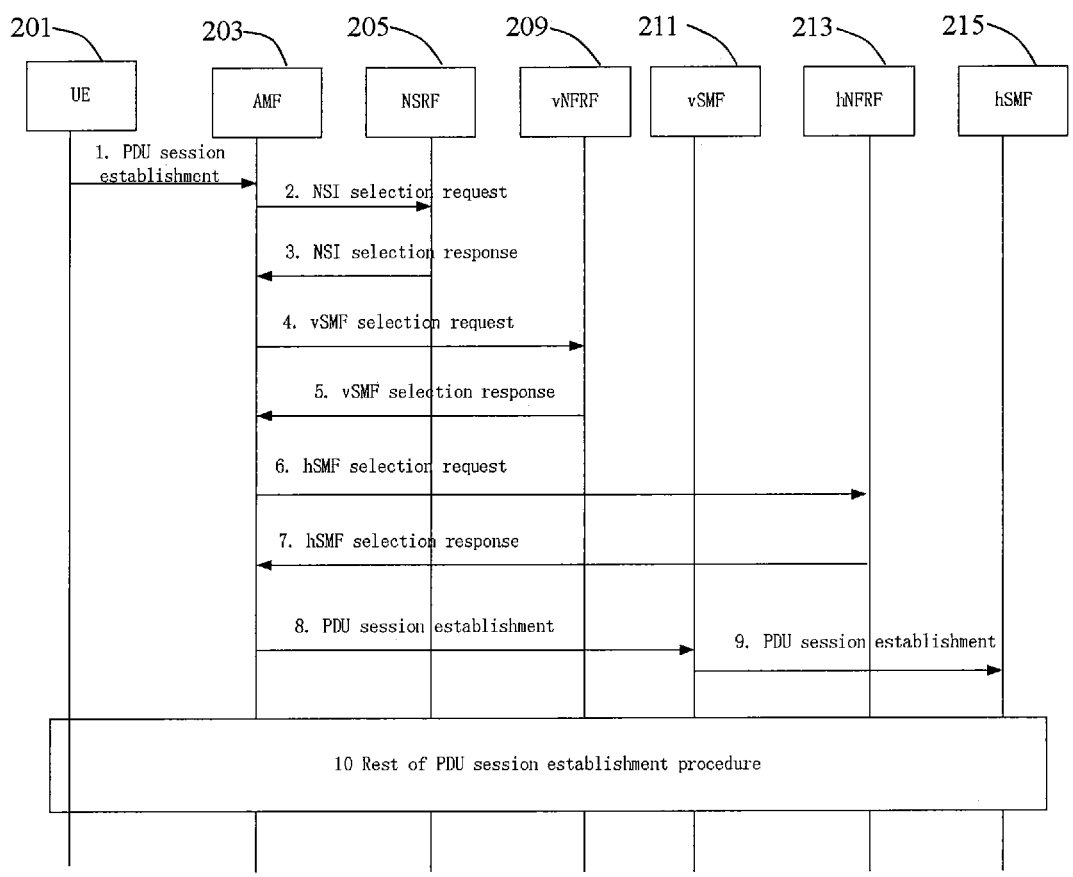
FIG. 4 illustrates a method of establishing a PDU session establishment across a visited network and a home network, in accordance with another embodiment of the invention.

FIG. 4 illustrates a method of establishing a PDU session across both a visited network 100 and a home network 120, in accordance with another embodiment of the invention. As shown in FIG. 4, operations 1-5 are substantially similar to operations 1-5 described above with respect to FIG. 3. Therefore, for purposes of brevity, a description of these operations is not repeated here.

At operation 6, if the PDU session is home routed, the AMF maps the requested S-NSSAI to the corresponding S-NSSAI of the home network and further sends a SMF selection request to hNFRF 213 (as opposed to the vSMF 211 sending this request). In accordance with some embodiments, this request message includes the network function type set as "SMF" and may also include the mapped S-NSSAI of the home network. At operation 7, the hNFRF 213 selects one hSMF 215 in the home network and responds with a SMF selection response, which includes the address of the selected hSMF 215. At operation 8, the AMF 203 forwards the SM NAS PDU session establishment message received from UE to the selected vSMF 211. If the PDU session is home routed, the message also includes the mapped S-NSSAI of home network and hSMF address of the selected NSI. At operation 9, the vSMF 211 forwards the SM NAS PDU session establishment message received from AMF 203, which includes the S-NSSAI of the home network mapped from the requested S-NSSAI. At operation 10, the remaining steps for PDU session establishment are performed in accordance with conventional techniques.

Figure 5:
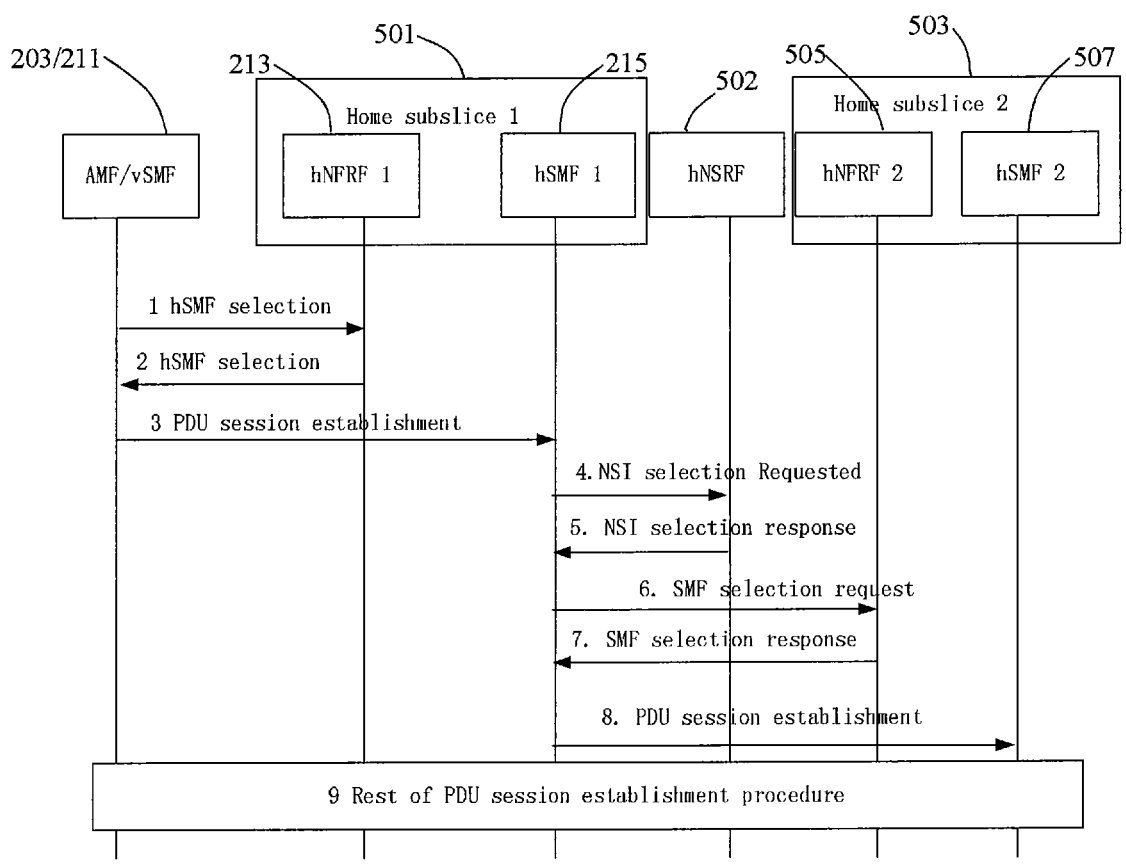
FIG. 5 illustrates a method of establishing a packet data unit (PDU) session performed between first and second session management functions of a home network, in accordance with a further embodiment of the invention.

FIG. 5 illustrates a method of passing the PDU session from a first home network subslice to a second home network subslice, in accordance with a further embodiment of the invention. At operation 1, the AMF 203 or vSMF 211 sends SMF selection request to hNFRF 213. It is noted that step 1 of FIG. 5 corresponds to either operation 7 of FIG. 3 or operation 6 of FIG. 4. In some embodiments, this request message includes the network function type set as "SMF" and may also include the S-NSSAI of home network. Next at operation 2, the hNFRF 213 associated with a first home subslice 501 selects one hSMF1 215 in the first subslice 501 of the home network and responds with a SMF selection response, which includes the address of the selected hSMF1 215. At operation 3, the AMF 203 or vSMF 211 forwards the SM NAS PDU session establishment message to the selected hSMF1 215, which also includes the mapped S-NSSAI of the home network mapped from the requested S-NSSAI.

Next, at operation 4, the hSMF1 215 may detect it is not proper to serve the S-NSSAI for one of various reasons. In this case, the hSMF1 may consult the hNSRF 502 of the home network 120 to select another NSI. Thereafter, the hSMF1 215 sends a NSI selection request message to the hNSRF 502. This NSI selection request message includes mapped S-NSSAI of the home network. Next, at operation 5, taking the received information into account, the hNSRF 502 selects one NSI and responds with a NSI selection response message, which includes an address of a hNFRF2 505 of the selected NSI associated with a second home subslice 503. Next, at operation 6, the hSMF1 215 further sends a SMF selection request to hNFRF2 505, which includes the network function type set as "SMF" and may also include the associated S-NSSAI of the home network. At operation 7, the hNFRF2 505 selects one hSMF2 and responds with a SMF selection response, which includes an address of the selected hSMF2 507. At operation 8, the hSMF1 215 forwards the PDU session establishment message received from the AMF 203 or vSMF 211 to the hSMF2 507. At operation 9, the remaining steps for PDU session establishment are performed in accordance with conventional techniques.

While various embodiments of the invention have been described above, they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure is not limited to the above-described exemplary embodiments.

Additionally, any reference to an element herein using a designation such as "first," "second," and so forth does not generally limit the quantity or order of those elements. Rather, these designations are used herein as a convenient means of distinguishing between two or more elements or instances of an element. Thus, a reference to first and second elements does not mean that only two elements can be present, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, software, or any combination of these techniques. To illustrate this interchangeability of hardware, firmware and software, various illustrative components, blocks, modules, circuits, and steps have been described above generally in terms of their functionality. Whether such functionality is implemented as hardware, firmware or software, or a combination of these technique, depends upon the particular application and design constraints imposed on the overall system. Skilled artisans can implement the described functionality in various ways for each particular application, but such implementation would not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA), or other programmable logic device, or any combination of these implementations. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented by executing software stored on a computer-readable medium. Computer-readable media includes both computer storage media and communication media including any medium that can transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can store desired program code in the form of instructions or data structures and that can be accessed by a computer.

In this document, the terms "module" or "unit" as used herein, refer to software, firmware, hardware, and any combination of these elements for performing the associated functions described herein. Additionally, for purpose of discussion, the various modules or units are described as discrete modules or units; however, as would be apparent to one of ordinary skill in the art, two or more modules or units may be combined to form a single module or unit that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by an Access and Mobility Management Function (AMF) of a serving network, comprising:
receiving a registration request from a user equipment (UE) device visiting the serving network;
sending access location information and allowed network slice selection assistance information (NSSAI) associated with the UE device to a logical network database, wherein the allowed NSSAI is allowed by a home network of the UE device;
receiving, from the logical network database, (a) accepted NSSAI that is for the serving network and accepted by the logical network database and (b) associated NSSAI that is for the home network and associated with the accepted NSSAI; and
sending a registration accepted message to the UE device, wherein the registration accepted message comprises the accepted NSSAI.

2. The method of claim 1 further comprising:
sending an update request to a subscriber database of the home network; and
receiving the allowed NSSAI from the subscriber database.

3. The method of claim 1 wherein:
the registration request comprises configured NSSAI associated with the UE device, and
the accepted NSSAI is generated by mapping the configured NSSAI and the allowed NSSAI to corresponding NSSAI of the serving network and finding common NSSAI that are supported in an area indicated by the access location information.

4. The method of claim 1 further comprising receiving information identifying network slice instances associated with the accepted NSSAI.

5. An apparatus of a serving network, comprising:
at least one processor and a memory coupled to the processor, the at least one processor configured to:
receive a registration request from a user equipment (UE) device visiting the serving network;
send access location information and allowed network slice selection assistance information (NSSAI) associated with the UE device to a logical network database, wherein the allowed NSSAI is allowed by a home network of the UE device;
receive, from the logical network database, (a) accepted NSSAI that is for the serving network and accepted by the logical network database and (b) associated NSSAI that is for the home network and associated with the accepted NSSAI; and
send a registration accepted message to the UE device, wherein the registration accepted message comprises the accepted NSSAI.

6. The apparatus of claim 5, wherein the at least one processor is further configured to:
send an update request to a subscriber database of the home network; and
receive the allowed NSSAI from the subscriber database.

7. The apparatus of claim 5, wherein:
the registration request comprises configured NSSAI associated with the UE device, and
the accepted NSSAI is generated by mapping the configured NSSAI and the allowed NSSAI to corresponding NSSAI of the serving network and finding common NSSAI that are supported in an area indicated by the access location information.

8. The apparatus of claim 5, wherein the at least one processor is further configured to receive information identifying network slice instances associated with the accepted NSSAI.

9. A non-transitory computer-readable medium having computer-executable instructions stored thereon, the computer-executable instructions, when executed by a processor, causing the processor to perform:
receiving a registration request from a user equipment (UE) device visiting the serving network;
sending access location information and allowed network slice selection assistance information (NSSAI) associated with the UE device to a logical network database, wherein the allowed NSSAI is allowed by a home network of the UE device;
receiving, from the logical network database, (a) accepted NSSAI that is for the serving network and accepted by the logical network database and (b) associated NSSAI that is for the home network and associated with the accepted NSSAI; and
sending a registration accepted message to the UE device, wherein the registration accepted message comprises the accepted NSSAI.

10. The non-transitory computer-readable medium of claim 9, wherein the computer-executable instructions, when executed by a processor, further causing the processor to perform:
sending an update request to a subscriber database of the home network; and
receiving the allowed NSSAI from the subscriber database.

11. The non-transitory computer-readable medium of claim 9, wherein:
the registration request comprises configured NSSAI associated with the UE device, and
the accepted NSSAI is generated by mapping the configured NSSAI and the allowed NSSAI to corresponding NSSAI of the serving network and finding common NSSAI that are supported in an area indicated by the access location information.

12. The non-transitory computer-readable medium of claim 9, wherein the computer-executable instructions, when executed by a processor, further causing the processor to perform:
receiving information identifying network slice instances associated with the accepted NSSAI.

* * * * *